Jan. 30, 1934.　　　J. R. HEIDLOFF　　　1,944,890
HOSE COUPLING
Filed Aug. 24, 1931　　　4 Sheets-Sheet 1
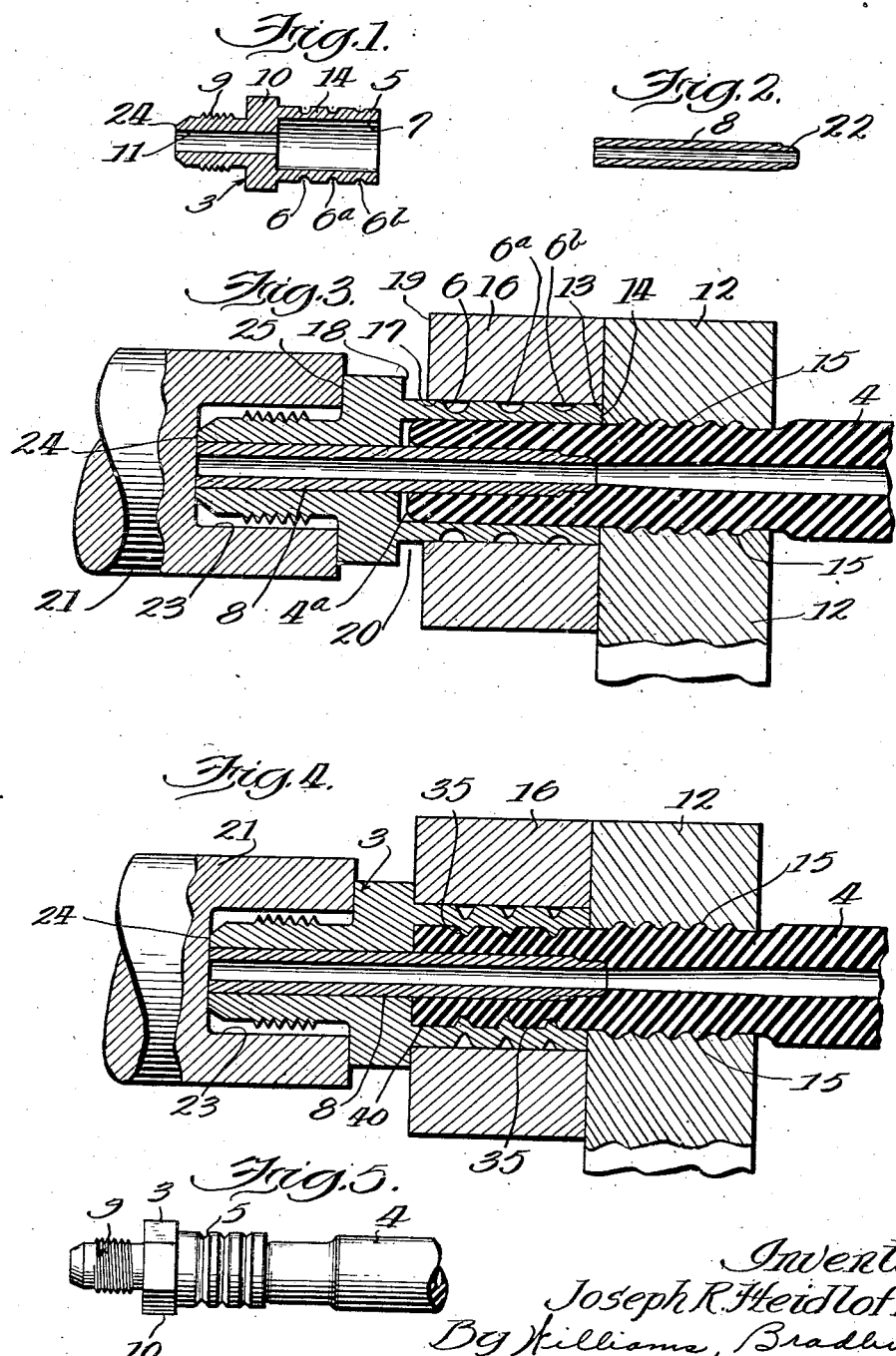
Inventor:
Joseph R. Heidloff
By Williams, Bradbury,
McCabe & Hinkle
Attys.

Jan. 30, 1934.  J. R. HEIDLOFF  1,944,890
HOSE COUPLING
Filed Aug. 24, 1931  4 Sheets-Sheet 2
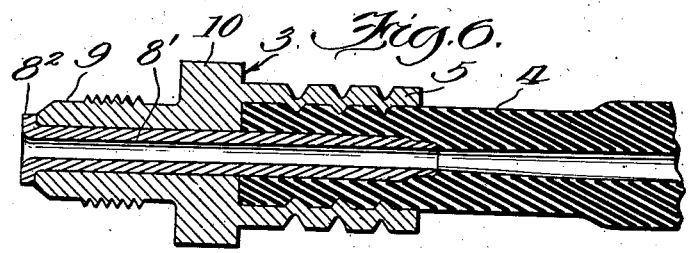
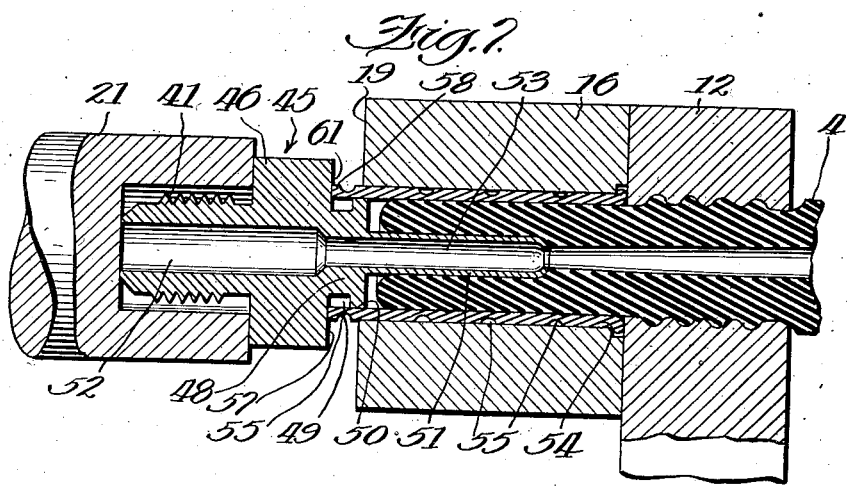
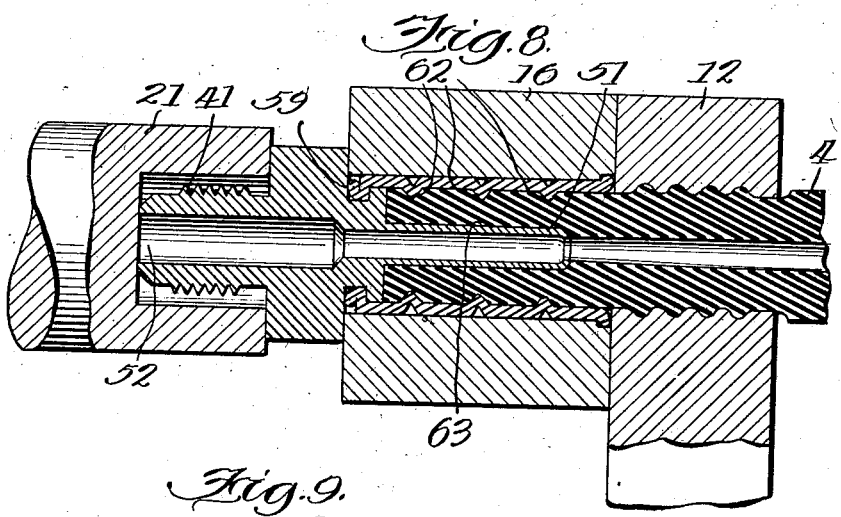

Jan. 30, 1934.  J. R. HEIDLOFF  1,944,890
HOSE COUPLING
Filed Aug. 24, 1931   4 Sheets-Sheet 3

Inventor:
Joseph R. Heidloff
By Williams, Bradbury,
McCabe & Hinkle
Attys.

Jan. 30, 1934.   J. R. HEIDLOFF   1,944,890
HOSE COUPLING
Filed Aug. 24, 1931   4 Sheets-Sheet 4
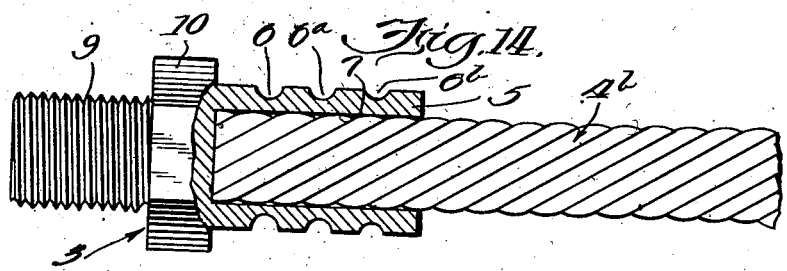
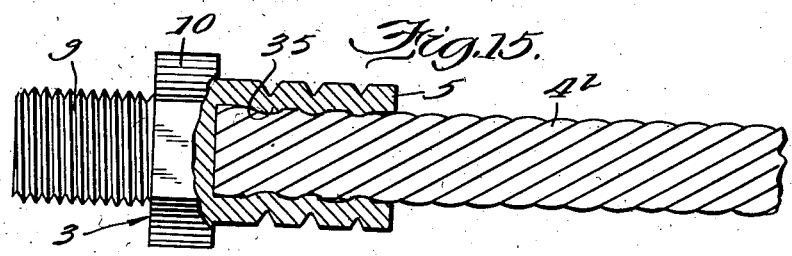
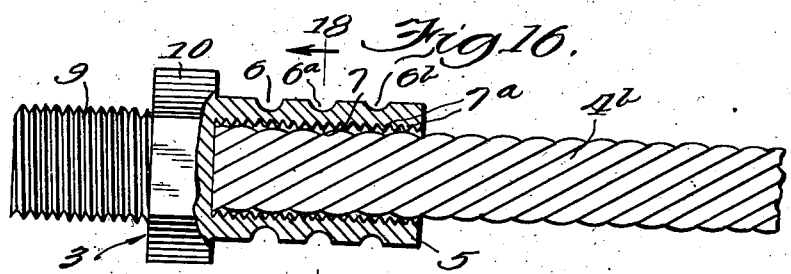
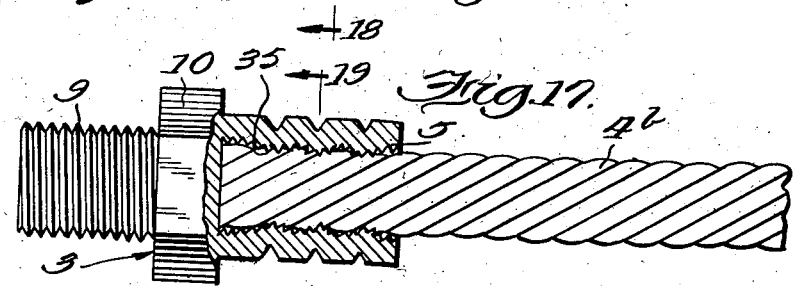
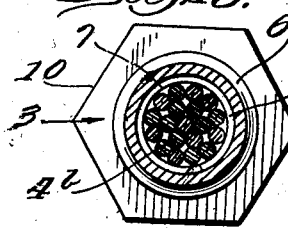
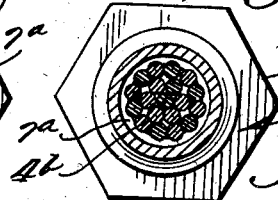
Inventor:
Joseph R. Heidloff
By Williams, Bradbury,
McCaleb & Hinkle.
Attys.

Patented Jan. 30, 1934

1,944,890

UNITED STATES PATENT OFFICE 1,944,890

HOSE COUPLING

Joseph R. Heidloff, Detroit, Mich., assignor to Hydraulic Brake Company, Detroit, Mich., a corporation of California Application August 24, 1931. Serial No. 558,964

7 Claims. (Cl. 285—84)

This invention relates to couplings, and particularly to the construction and the method of attaching a coupling to a hose or other flexible member, such as wire cables and the like. This application is in part a continuation of my application, Serial No. 483,209, filed September 20, 1930.

Flexible hose is universally used in hydraulic brake systems to interconnect relatively movable parts and comprises a rubber tube having layers of stranded material imbedded therein which renders the hose substantially non-expansible which is most essential. Such flexible hose are illustrated in the patent application of Malcolm Loughead, Serial No. 293,673, filed July 18, 1928 for flexible hose for fluid pressure systems.

The fluid pressure developed in a hydraulic braking system, and especially when a sudden stop is necessary, rises to a high degree, and this necessitates the provision of a strong and durable coupler for connecting the hose to the metallic parts of the system, and one of the objects of my invention is to provide an improved hose coupling used in connections of the above type.

Another object is the provision of a coupler which may be joined to not only fabric hoses for hydraulic brakes but may be employed with hoses in general and may even be fixedly connected with various types of metal covered hoses, and other flexible members.

Another object of my invention is the provision of a coupling that is not subject to separation from the hose when excessive pressure forces are applied.

A further object is to provide a hose coupling which is not subject to leakage under high pressure.

A further object is to provide a simple and inexpensively constructed hose coupling consisting of few parts which are easily assembled to provide an improved coupling for high pressure duty.

A further object is to provide an interlocking connection between the hose and the coupling member.

A further object of the invention is to provide a coupling which is readily applied to a flexible member so as to withstand strong forces tending to separate them.

The above objects and others not particularly pointed out will appear in the following description in connection with the accompanying drawings in which like reference characters in the several views denote like parts and in which Fig. 1 is a medial section of the coupling member of my invention before receiving a hose;

Fig. 2 is a medial section of the nipple which is associated with the coupling assembly;

Fig. 3 is a side elevation in section of an apparatus embodying the invention, showing the apparatus at an intermediate stage of the assembly operation;

Fig. 4 is a view similar to Fig. 3, showing the apparatus at the completion of the assembly operation;

Fig. 5 is a view of the coupling member of my invention secured to a hose;

Fig. 6 is a sectional view of a coupling member similar to that shown in Fig. 4 but in which the nipple extending into the hose is provided with an annular flange overlying the end of the coupling member;

Fig. 7 is a side elevation in section of a modified form of coupling and apparatus for assembling the same at an intermediate stage of the assembly operation;

Fig. 8 is a view similar to Fig. 7, showing the apparatus at the completion of the assembly operation;

Fig. 9 is a view in elevation of the sleeve for interlocking the hose and coupling member in its first form;

Fig. 14 is a sectional view of a coupling and a wire cable adapted to be secured thereto, in an initial stage of assembly;

Fig. 15 is a similar view showing the final state of assembly;

Fig. 16 is a view similar to Fig. 14 showing a modified form of coupling;

Fig. 17 is a similar view showing the final state of assembly;

Fig. 18 is a transverse section taken on the line 18—18 of Fig. 16; and

Fig. 19 is a similar view taken on the line 19—19 of Fig. 17.

Figure 10:
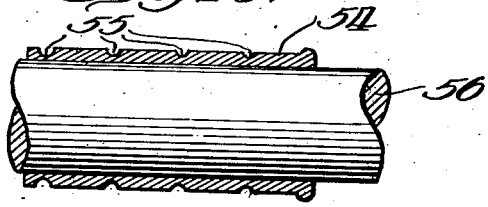
Fig. 10 is a view in section of the sleeve for interlocking the hose and coupling member in its final form.
Figure 11:
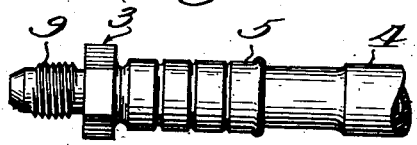
Fig. 11 is a view of the coupling member secured to the hose.

Referring now to the drawings, the apparatus shown in connection with the coupling of my invention illustrates a method of assembling the coupling, indicated generally by the reference character 3, to a high pressure type hose 4 such as is used in hydraulic braking systems.

The coupling 3 of my invention comprises a cylindrical sleeve portion 5 provided with a plurality of annular U-shaped grooves 6, 6a and 6b respectively, preferably of varying depths. Given for instance the diameter through the coupling from bottom to bottom of the groove 6, the diameters at the bottoms of the grooves 6a may be .01 inch greater, and at the bottoms of grooves 6b .02 inch greater than at groove 6, being progressively shallower toward the end of the coupling to the amount of .01 inch, for each successive groove, which grooves are equally spaced along the circumferential face of the same to provide means for securing the coupling 3 to the hose 4 by displacing that portion of the metal or wall in the bottom of the grooves 6 to form an interlock between the coupling 3 and hose 4.

The sleeve portion 5 is provided with an internal bore 7 of slightly smaller diameter than the hose which it is adapted to receive to cause a slight initial compression of the hose 4 when the same is inserted in the bore 7, so that the subsequent insertion of a nipple 8 in the hose 4 causes a further compression of that portion of the hose lying within the bore 7 of the coupling 3.

The coupling 3 has an end portion 9 which is threaded for connecting the coupling to a companion part of a motor vehicle or the like and an intermediate portion 10 preferably hexagonal in shape to facilitate the application of a suitable tool or wrench for threading the coupling to its companion member. A further reduced internal bore 11, extending centrally through the threaded and hexagonal portions 9 and 10, communicates with the bore 7 and is of a size to provide a force fit for the nipple 8 as the same is forced into that portion of the hose 4 extending into the bore 7.

In assembling, the hose 4 which is of slightly larger diameter than the size of the bore 7, is inserted therein a short distance from the bottom of the same. This insertion causes a more or less rounding deformation at the end of the hose as at 4a because of the distortion of the rubber or other elastic material by pressure or friction of the sleeve and nipple on the hose. A split clamping member 12 is now clamped about the protruding portion of the hose 4 adjacent the sleeve portion 5 with its shoulder 13 abutting against the annular end 14 of the sleeve portion 5. The internal clamping faces of the members 12 are provided with ridges 15 which suitably grip the external wall of the hose 4 to prevent movement of the hose 4 relative to the clamping member 12 during assembly. A split guide member 16 is also provided having a central bore extending therethrough and is of a size to conveniently receive the sleeve portion 5 of the coupling 3.

The guide member 16, when in position, rests against the clamping member 12 and encompasses the major length of the sleeve portion 5 as clearly illustrated in Fig. 3, and serves as a guide and positioning block. The width of the guide member 16 in relation to the length of the sleeve 5 determines the amount that the sleeve 5 may be shortened by the displacement of the metal or wall in the bottom of the annular U-shaped grooves 6 when pressure is applied to the coupling 3 by suitable pressure means. The face 18 of the hexagonal portion 10 is thus spaced a predetermined distance from the end face 19 of the guide member 16 and this space 20, as illustrated in Fig. 3, determines the extent to which the sleeve 5 may be shortened.

With the parts thus assembled as above described, the clamping member is placed upon a suitable supporting means in alignment with a suitable press head 21 which is reciprocated by suitable power means. The nipple 8, the length of which is substantially that of the coupling 3, is provided with a slightly tapered end portion 22 and is then inserted in the bore 11 and the press head 21 moved downwardly into engagement with the exterior end of the nipple to force the same through the bore 11 and into the hose 4.

The press head 21 is provided with an aperture 23, the depth of which is substantially that of the length of the reduced threaded end portion 9 so that as the nipple is forced into place, and its end flush with the end 24 of the coupling 3, the parts will assume the position illustrated in Fig. 3. In this position the threaded end 9 projects into the aperture 23 in the press head 21 with the base of same engaging the annular face 25 of the intermediate hexagonal portion 9.

As the thickness of those portions of the wall in the bottom of the grooves 6, 6a and 6b are considerably less than the wall proper of the sleeve portion 5, and as these portions are progressively thicker toward the end continued movement of the press head 21 now acting upon the hexagonal portion 10 will cause the metal in the bottom of the U-shaped grooves 6, 6a and 6b to be displaced or deformed inwardly in the order mentioned under the influence of the force or pressure applied by the press head. This displacement thus produces or forms a plurality of annular V-shaped protuberances 35 which are forced into the outer wall of that portion of the hose 4 extending into the bore 7 of the sleeve portion 5, as clearly illustrated in Fig. 4. The displacement or deforming of that portion of the metal at the bottom of the grooves 6, 6a and 6b will necessarily shorten the length of the sleeve portion an amount equal to the width of the gap 20 between respective faces 18 and 19 of the hexagonal portion 10 and the guide member 16, and when the face 18 of the portion 10 engages the end face 19 of the guide member 16 further displacement is prohibited. These annular V-shaped protuberances 35 are thus forced inwardly and firmly embedded in the outer wall of hose 4 to effectually prevent any possibility of the coupling 3 working loose and thus provide for a plurality of annular seals 40 between the internal wall of the hose 4 and the outer wall of the nipple 8 and provide a hose coupling which is not subject to leakage under high pressure.

The reduction in length of the sleeve portion 5, due to the deformation of the metal in the bottom of the grooves 6, 6a and 6b also forces the hose 4 into the bore 7, causing the hose end 4a to firmly abut against the bottom of the bore 7. The portion of the nipple 8 extending into the hose 4 serves as a reinforcement to prevent the collapse of the hose during the deforming operation and is substantially a continuation of the interior of the hose connected by the coupling, thereby giving an unrestricted passage for the fluid.

After the coupling 3 is attached to the hose 4, as above described, the clamping member 12 and guide member 16 are removed, the finished product being clearly illustrated in Fig. 5.

The coupling, as illustrated in Fig. 6, is similar to that illustrated in Fig. 4 but is provided with a nipple 8' having an annular end flange 82 which overlies the end of the threaded portion 9 of the coupling member 3. This flange 82 may serve as a gasket where the coupling is connected to a companion part of a motor vehicle or the like.

Referring now to Figs. 7 to 11, inclusive, I illustrate therein a coupling member provided with a modified form of interlock between the coupling member and hose and the method of assembling the same to form a unitary structure.

The coupling member as illustrated and indicated generally by the reference character 45 comprises an intermediate enlargement 46, preferably hexagonal in shape, and a reduced cylindrical portion 47 to the left of the enlargement 46 which is threaded to permit the connection of the coupling member to a companion part of the motor vehicle or the like. The hexagonal enlargement 46 provides for the application of a suitable tool for attaching the coupling member to its companion member.

A reduced portion 48 to the right of the hexagonal enlargement is provided with an annular groove 49 which provides the end of the portion 48 with an annular flange or shoulder 50 which, in combination with the groove 49, is for purposes as will presently be described. The coupling member 45 is also provided with an integrally formed tubular portion extending forward of the portion 48 in the form of a nipple 51 which is adapted for insertion into the hose 4 during the assembly of the coupling 45 and the hose. An entrance bore 52 extending partially through the coupling member 45 communicates with the reduced bore 53 extending through the nipple extension 51 of the same.

A sleeve 54 for securing the coupling member 45 to the hose 4 comprises, as is shown in Fig. 9, a piece of seamless metal tubing such as steel, of predetermined length, which is fabricated to provide in the external wall of the same a plurality of annular U-shaped grooves 55 which are preferably progressively deeper toward the coupler end as assembled to the extent of .01 inch for each successive groove. These U-shaped grooves 55 may be formed in the exterior wall of the sleeve 54 in any suitable manner but preferably by means of a suitable rolling or spinning operation in which the sleeve is supported on a suitable mandrel 56 to prevent the deformation of the internal wall of the same during such forming operation, as clearly illustrated in Fig. 10.

In assembly, the hose to which the coupling member 45 is secured is inserted in the sleeve 54 a predetermined distance, causing a slight initial compression of the hose 4 as the external diameter of the hose 4 is slightly larger than the internal diameter of the sleeve 54. In case the hose is too large and not perfectly cylindrical it may be necessary to buff it down a small amount in any suitable manner. A split clamping member and a split guide member, similar to the members 12 and 16 described in connection with Figs. 3 and 4 respectively, clamp the protruding portion of the hose 4 adjacent the sleeve 54 and encompass the major portion of the sleeve 54. The end of the nipple extension 51 of the coupling member 45 may now be inserted in the end of the hose lying within the sleeve 54 and with the parts thus assembled the member 12 is placed upon a suitable supporting plate and the press head 21, as previously described, moved into contact engagement with the hexagonal enlargement 46.

Pressure exerted against the enlargement 46 by the head 21 forces the nipple 51 into the bore of the hose 4, and continued travel of the coupling member 45 under the influence of the head 21 causes the face 57 of the enlargement 46 to engage the end 58 of the protruding portion of the sleeve 54. The width of the guide member 16 in relation to the length of the sleeve determines the amount that the sleeve may be shortened by the displacement of the metal or wall in the bottom of the annular U-shaped grooves 55 when pressure is applied. The metal at the bottom of the grooves is displaced as hereinbefore described, the thinnest part collapsing first and then in succession in the order of thinness of the metal. The face 57 of the hexagonal portion 46 is thus spaced a predetermined distance from the end face 19 of the guide member 16 when it contacts the end 58 of the sleeve 54, and this space 61, as clearly illustrated in Fig. 7, determines the extent that the sleeve may be shortened.

Further movement of the coupling member 45 under the influence of the press head 21 now causes the metal or wall of the sleeve 54 in the bottom of the annular grooves 35 encompassed by the guide member 18 to be displaced to form a plurality of annular substantially V-shaped protuberances 62 which are forced into the outer wall of the hose 4, as clearly illustrated in Fig. 8, and this displacement continues until the face 57 of the hexagonal enlargement 46 engages the face 19 of the guide member 16. These annular V-shaped protuberances 62 are thus forced inwardly and firmly embedded in the outer wall of the hose 4 to effectually prevent any possibility of the hose working loose. The metal or wall in the bottom of the groove 55 adjacent the end 58 of the protruding portion of the sleeve 54 is also displaced to enter the groove 49 in the portion 48 to the right of the enlargement 46 in the form of an inturned bead 59 which overlies the flange 50, and the bead in combination with the V-shaped protuberances, prevents the coupling member 45 and sleeve 52 working loose. The protuberances 62 thus provide for a plurality of seals 63 between the hose 4 and the outer wall of the nipple extension 51 which extends into the hose 4 and serves as a reinforcement to prevent the collapse of the hose during this deforming operation. The end of the hose 4, due to the reduction in length of the sleeve 54, is forced against the end face of the portion 48, causing the hose to be firmly seated against this face. The coupling in its final form is clearly illustrated in Figs. 8 and 11.

Figure 13:
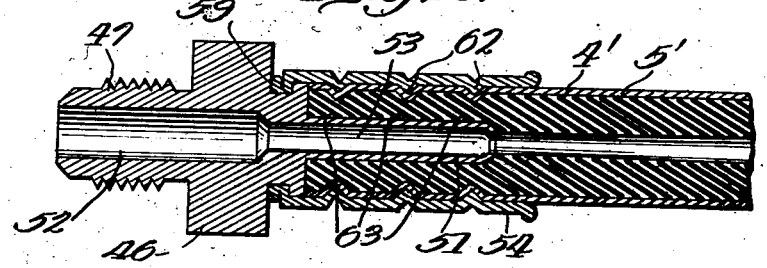
Fig. 13 is a view similar to Fig. 8 but showing the coupling assembly apparatus removed and illustrating a hose with a metal sheath.
Figure 12:
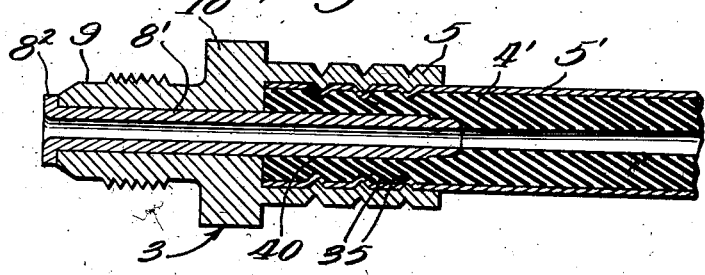
Fig. 12 is a longitudinal sectional view of a coupling member similar to Fig. 6 but illustrating a hose provided with a metal sheath.

In Figs. 12 and 13 I have illustrated the same forms of my invention hereinbefore specifically described and as shown in Figs. 6 and 8 respectively except that I have employed a hose 4' with a metal sheath 5', which for example may be woven metal fabric, the hose being of such size to snugly fit within the sleeve before being deformed.

In Figs. 14 to 19 inclusive, I have illustrated the manner in which my improved coupling may be employed with a solid flexible member such as a wire cable 4b. In this construction the nipple 8 is omitted and the threaded end 9 is solid. To effect the assembly the end of the cable 4b is inserted in the bore 7 and the sleeve 5 is collapsed longitudinally as described above to produce protuberances 35 which firmly engage the outer surface of the cable and secure the coupling to the cable. It is to be noted that with a rubber hose it is preferred to leave a clearance between the end of the hose and the end of the bore 7. In the case of a wire cable this is not preferred, and the cable is inserted into the hose to the full extent.

Where a stranded cable is employed, I may provide internal projections or ridges 7a on the surface of the bore 7, as shown in Figs. 16 to 19. These ridges may suitably be screw-threads produced by tapping said bore. When the sleeve 5 is collapsed, protuberances 35 are produced as before and in addition the ridges 7a are deformed in the manner shown in Fig. 19 by engagement with the outermost strands of the cable, so that the joint is increased.

While I have illustrated and described my invention for particular uses, it is to be understood that the coupling of my invention is applicable for other uses, and changes and modifications may be made, but I aim to cover all such changes and modifications as come within the spirit and scope of the appended claims.

What I claim as new and desire to cover by United States Letters Patent is:

1. A coupling member adapted to be attached to the end of a hose, comprising a sleeve for receiving one end of said hose, a nipple extending through said sleeve and into the end of the hose, and annular axially weakened portions in said sleeve adapted to cause said sleeve to be deformed inwardly at spaced intervals when shortened by longitudinal pressure to clamp said hose against said nipple and interlock said sleeve and said hose.

2. A coupling member adapted to be attached to the end of a small diameter flexible fabric hose for hydraulic brake systems and the like, comprising a sleeve for receiving one end of said hose, said sleeve being of substantially the same diameter as the exterior of said hose, a nipple extending into said sleeve and into the end of the hose, and annular axially weakened portions in said sleeve adapted to cause said sleeve to be deformed inwardly at spaced intervals when shortened by longitudinal pressure to clamp said hose against said nipple and interlock said sleeve and said hose.

3. A coupling member adapted to be attached to the end of a hose, comprising a sleeve for receiving one end of said hose, a nipple extending through said sleeve and into the end of said hose, and annular equally spaced axially weakened portions in said sleeve adapted to cause said sleeve to be deformed inwardly at spaced intervals when shortened by longitudinal pressure to clamp said hose against said nipple and interlock said sleeve and said hose.

4. A coupling member adapted to be attached to the end of a hose, comprising a sleeve for receiving one end of said hose, a nipple in said sleeve and extending into the end of the hose, and annular portions in said sleeve axially weakened to different degrees to cause said sleeve to be deformed inwardly at spaced intervals and in a predetermined sequence when shortened by longitudinal pressure to clamp said hose against said nipple and interlock said sleeve and said hose.

5. A coupling member adapted to be attached to the end of a hose, comprising a sleeve for receiving one end of said hose, a nipple located in said sleeve and extending into the end of the hose, and annular portions in said sleeve axially weakened in progressively increasing degrees to cause said sleeve to be deformed inwardly at spaced intervals and in predetermined sequence when shortened by longitudinal pressure to clamp said hose against said nipple and interlock said sleeve and said hose.

6. A coupling member adapted to be attached to the end of a small diameter flexible fabric hose for hydraulic brake systems and the like, comprising a sleeve for receiving one end of said hose, said sleeve having a diameter substantially equal to the outside diameter of said hose, a nipple having a smooth outer surface forming a part of said member located in said sleeve and extending into said hose, and annular axially weakened portions in said sleeve adapted to cause said sleeve to be deformed inwardly at spaced intervals when shortened by longitudinal pressure to clamp said hose against said nipple and interlock said sleeve and said hose.

7. A coupling member adapted to be attached to the end of a flexible fabric hose for hydraulic brakes and the like, comprising a sleeve for receiving one end of said hose, a separate nipple press fitted into said member and extending into said sleeve and into the end of the hose, and annular axially weakened portions in said sleeve adapted to cause said sleeve to be deformed inwardly at spaced intervals when shortened by longitudinal pressure to clamp said hose against said nipple and interlock said sleeve and said hose.

JOSEPH R. HEIDLOFF.